United States Patent
Friemel

[11] Patent Number: 6,162,174
[45] Date of Patent: Dec. 19, 2000

[54] METHOD FOR COMPENSATING FOR OBJECT MOVEMENT IN ULTRASOUND IMAGES

[75] Inventor: Barry H. Friemel, Redmond, Wash.

[73] Assignee: Siemens Medical Systems, Inc., Iselin, N.J.

[21] Appl. No.: 09/154,535

[22] Filed: Sep. 16, 1998

[51] Int. Cl.$^7$ ........................................................ A61B 8/02
[52] U.S. Cl. ................................................. 600/447; 348/403
[58] Field of Search ............................ 600/437, 440–447, 600/462; 128/916; 348/448, 403, 414; 378/62; 382/128

[56] References Cited

U.S. PATENT DOCUMENTS

| | | | |
|---|---|---|---|
| 5,538,004 | 7/1996 | Bamber | 600/462 |
| 5,602,891 | 2/1997 | Pearlman | 378/62 |
| 5,734,738 | 3/1998 | Sato | 382/128 |
| 5,776,066 | 7/1998 | Nock et al. | 600/443 |
| 5,825,429 | 10/1998 | Shirahata | 348/448 |
| 5,844,612 | 12/1998 | Israelsen | 348/414 |
| 5,873,830 | 2/1999 | Hossack et al. | 600/447 |
| 5,899,861 | 5/1999 | Friemel | 600/443 |
| 5,966,178 | 10/1999 | Tashima et al. | 348/403 |

*Primary Examiner*—Marvin M. Lateef
*Assistant Examiner*—Ali M. Imam
*Attorney, Agent, or Firm*—Lawrence C. Edelman; Andreas Grubert

[57] ABSTRACT

A method for producing interpolated ultrasound images by storing at least two sequential ultrasound images and detecting the movement of objects of interest within two sequential images. A movement vector is then determined that describes the movement of each object within an image. One or more interpolated images are then produced by combining data from two sequential ultrasound images and the movement vectors. In addition, three-dimensional ultrasound images can be compensated for movement of a transducer or object of interest. At least two sequential ultrasound images are obtained and movement vectors are calculated for each object of interest. After determining the movement vectors, the images are compensated for the movement to realign the object of interest. The compensated images are then combined to produce three dimensional images.

8 Claims, 8 Drawing Sheets

METHOD FOR COMPENSATING FOR OBJECT MOVEMENT IN ULTRASOUND IMAGES

FIELD OF THE INVENTION

The present invention relates to medical imaging systems in general, in particular to ultrasound imaging systems.

BACKGROUND OF THE INVENTION

Due to the inherent speed of sound in tissue and the time required to perform the necessary signal processing, the rate at which ultrasound images can be produced may be relatively slow, e.g., on the order of 10 frames per second. At this rate, a physician or sonographer is generally able to detect a noticeable flicker on a monitor as the images are displayed. This flicker detracts from the ability of the physician or sonographer to interpret the ultrasound images.

One prior technique of eliminating flicker from a series of ultrasound images is to perform frame interpolation whereby at least two sequential ultrasound images are created and stored in a memory. A number of interpolated or synthesized images are then created by combining data from the stored images. All the images including the actual and interpolated images are then shown to the user beginning at a rate at which flicker is undetectable. As the interpolated images are being displayed, the next ultrasound image is being created and stored in memory for use in creating another set of interpolated images and the process continues.

While the technique method of producing interpolated images does reduce image flicker, the result is a series of images whereby objects in the image appear to blur from one image to another. This is particularly true when an object or speckle pattern in an image changes position between images. Using this method, an object will appear to fade out from a first position and fade into a second position with no indication of a path traveled by the object to its final position. Therefore, there is a need for a method of producing ultrasound images that increases the apparent frame rate without creating blurred images and while simultaneously illustrating the movement of an object within an image.

SUMMARY OF THE INVENTION

The present invention is a method for increasing the frame rate at which ultrasound images are displayed while simultaneously simulating the movement of an object from one image to another. To increase the frame rate, a pair of sequential images are obtained and stored in a memory. One or more movement vectors are then calculated that describe how an object of interest changes position between a first image of the pair of sequential images and a second image of the pair of sequential images. One or more interpolated images are then created wherein each object is shown at a position in accordance with a fraction of the movement vectors calculated.

In addition, the present invention is useful in producing three-dimensional ultrasound images by compensating for movement of the ultrasound probe or an object of interest. To produce a three-dimensional image, data for one or more sequential ultrasound images are created and stored in memory. The stored data are then analyzed to calculate a number of movement vectors that describe the movement of an object between sequential images. Each image is then compensated for the movement of the object from a previous image. The compensated images are then combined to construct the three-dimensional ultrasound image.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is a method of producing interpolated ultrasound images at a frame rate whereby flicker of the images is substantially reduced. In addition, the interpolated images simulate movement of an object from one image to the next. Furthermore, the present invention can be used to improve the quality of three-dimensional ultrasound images by compensating for movement of the transducer or an object of interest between images.

Figure 1:
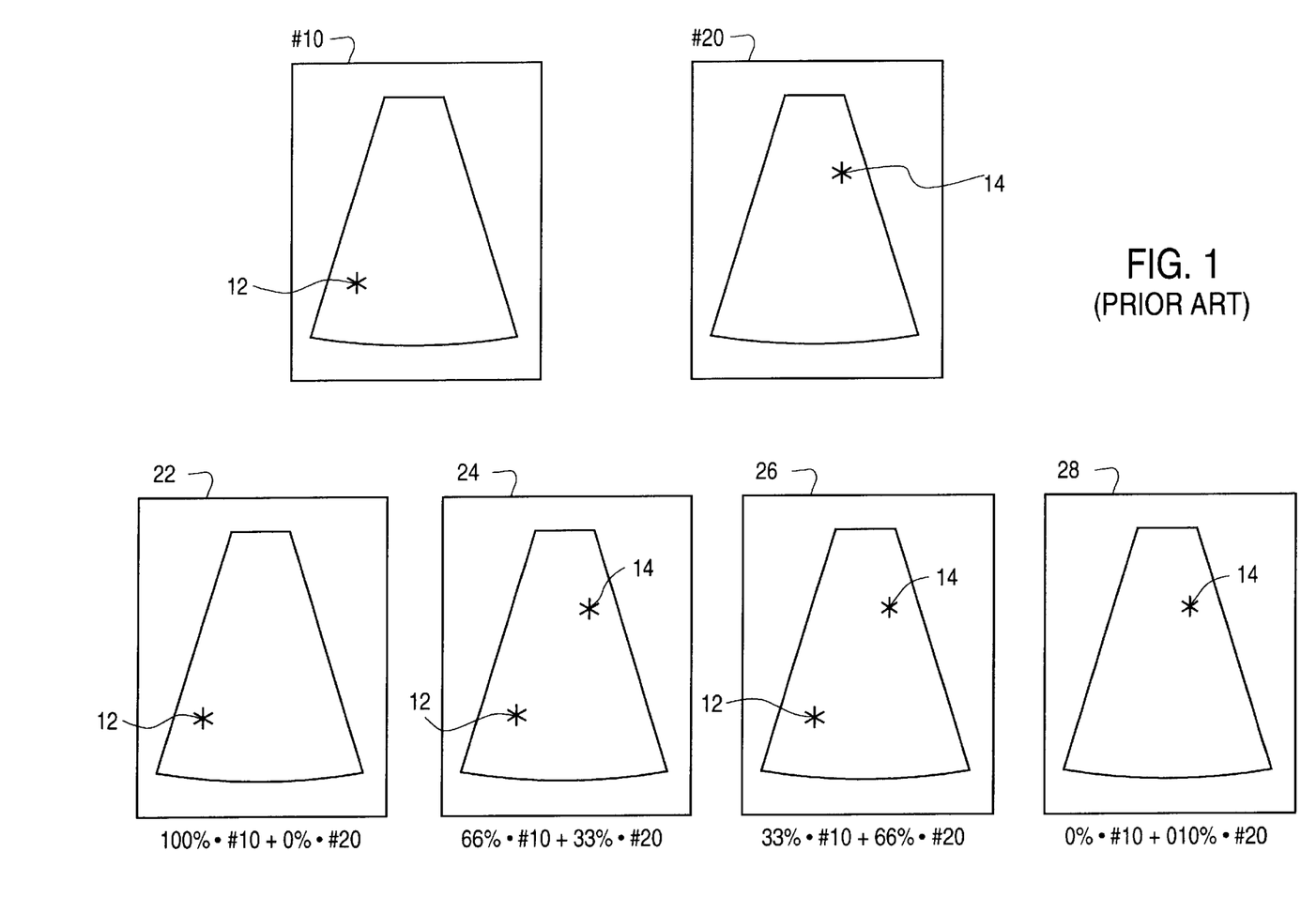
FIG. 1 illustrates a method of producing interpolated ultrasound images according to the prior art.

FIG. 1 illustrates a conventional method of producing one or more interpolated ultrasound images that can be shown at a frame rate at which the flicker of the images is substantially undetectable. To produce the interpolated images, the data required to produce a first ultrasound image 10 is created and stored in a memory of the ultrasound system followed by the data required to a second ultrasound image 20 which is created and stored in memory. For purposes of the present specification, the term "image" refers to the data used to create an image that is viewed by a user and to the image itself as appropriate. As can be seen by comparing the first image 10 and the second image 20, an object of interest has moved from a position 12 in the first image to a position 14 in the second image. The apparent movement of the object may occur due to movement of the object itself or due to movement of the ultrasonic transducer used in obtaining the images.

The traditional method of creating the interpolated ultrasound images is to combine varying percentages of the first and second stored images 10 and 20. For example, a first interpolated image 22 is created by combining 100% of the intensity of the pixels that comprise the first image 10 and 0% of the intensity of the pixels that comprise second image 20. A second interpolated image 24 is created by combining 66% of the pixel intensity of the first image 10 and 33% of the pixel intensity of the second image 20. A third interpolated image 26 is created by combining 33% of image 10 and 66% of image 20, while a fourth interpolated image 28 is created by combining 0% of image 10 and 100% of image 20. As will be appreciated, the actual percentages used to create the interpolated images may vary depending upon the number of images to be produced and the rate at which actual images can be computed and stored in memory.

The effect of combining data from both the first and second images 10 and 20 causes the object of interest to appear to fade out from its first position 12 and to fade into its final position 14. Furthermore, in the intermediate interpolated images 24 and 26, the same object of interest appears to be visible in two positions on the ultrasound image, thereby blurring the ultrasound images and decreasing their effectiveness in analyzing the internal body tissue of a patient. Furthermore, a physician or sonographer viewing the interpolated images 22–28 has no idea of the path traveled by the object of interest from its initial position 12 to its final position 14.

Figure 2:
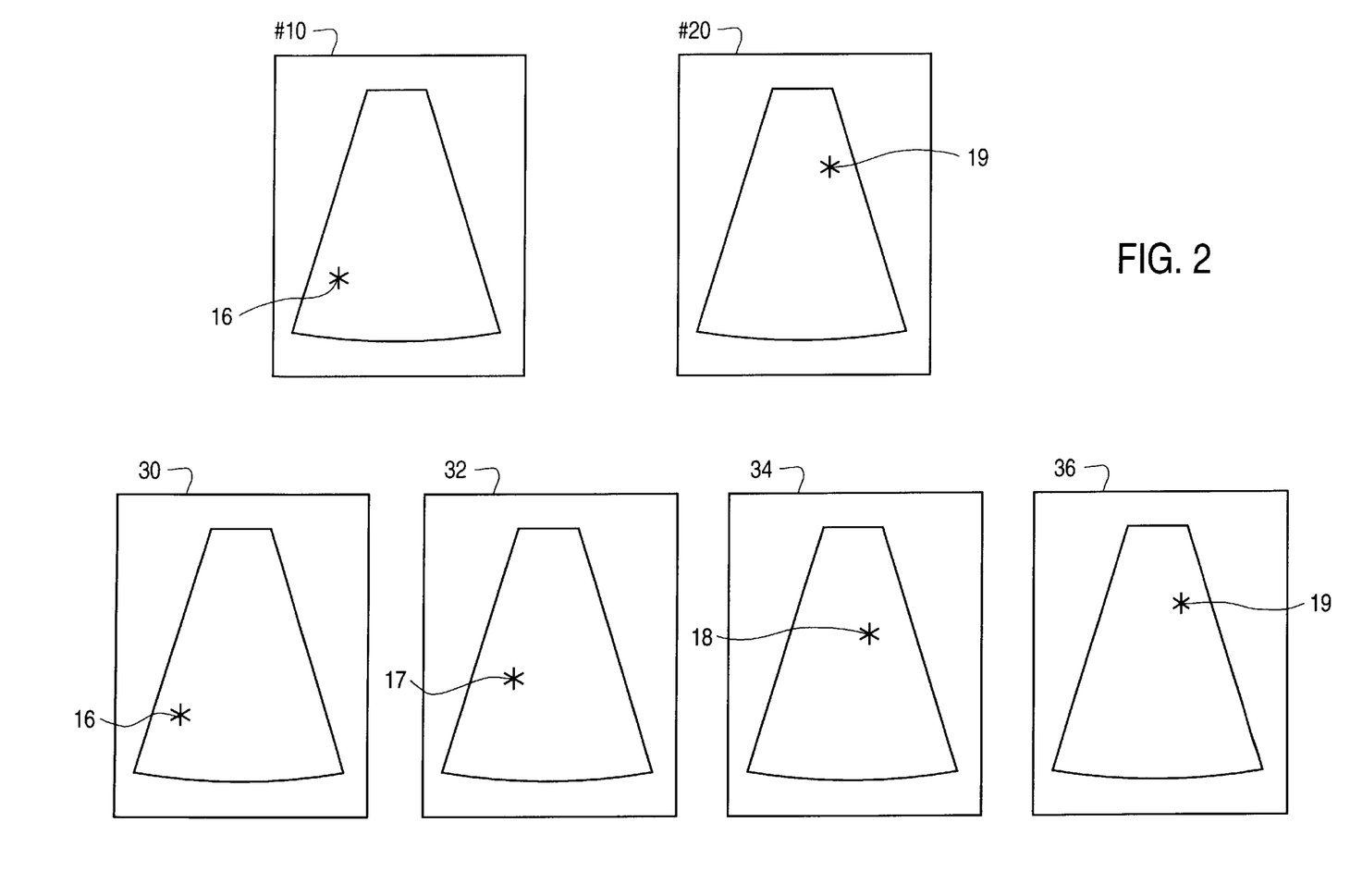
FIG. 2 illustrates a series of interpolated ultrasound images produced according to the present invention.

FIG. 2 illustrates a number of interpolated ultrasound images that are produced by the method according to the present invention. Again, the ultrasound system produces a first ultrasound image 10 that is stored in memory and a subsequent ultrasound image 20 that is stored in memory. Again, the images include an object of interest that has changed position from a first position 16 in the first image 10, to a final position 19 in the second image 20.

To increase the apparent frame rate of the ultrasound images, the present invention produces a series of interpolated images 30, 32, 34, and 36 and displays the interpolated images to a viewer at a rate whereby the flicker of the images is substantially undetectable. The first interpolated image 30 is substantially identical to the first stored image 10 while the final interpolated image 36 is substantially identical to the second stored image 20. In the first interpolated image 30, the object of interest is shown in its initial position 16 while in the final interpolated image 36, the object is shown in its final position 19. The intermediate interpolated images 32 and 34 are produced whereby the object of interest is shown at intermediate positions 17 and 18 that are between the initial and final positions.

As will be appreciated by comparing the images 32–36 with the images 22–28 produced by conventional techniques, the present invention substantially eliminates blurring of the objects in the interpolated images and provides a simulation of the object traveling from its initial to its final position.

Figure 3:
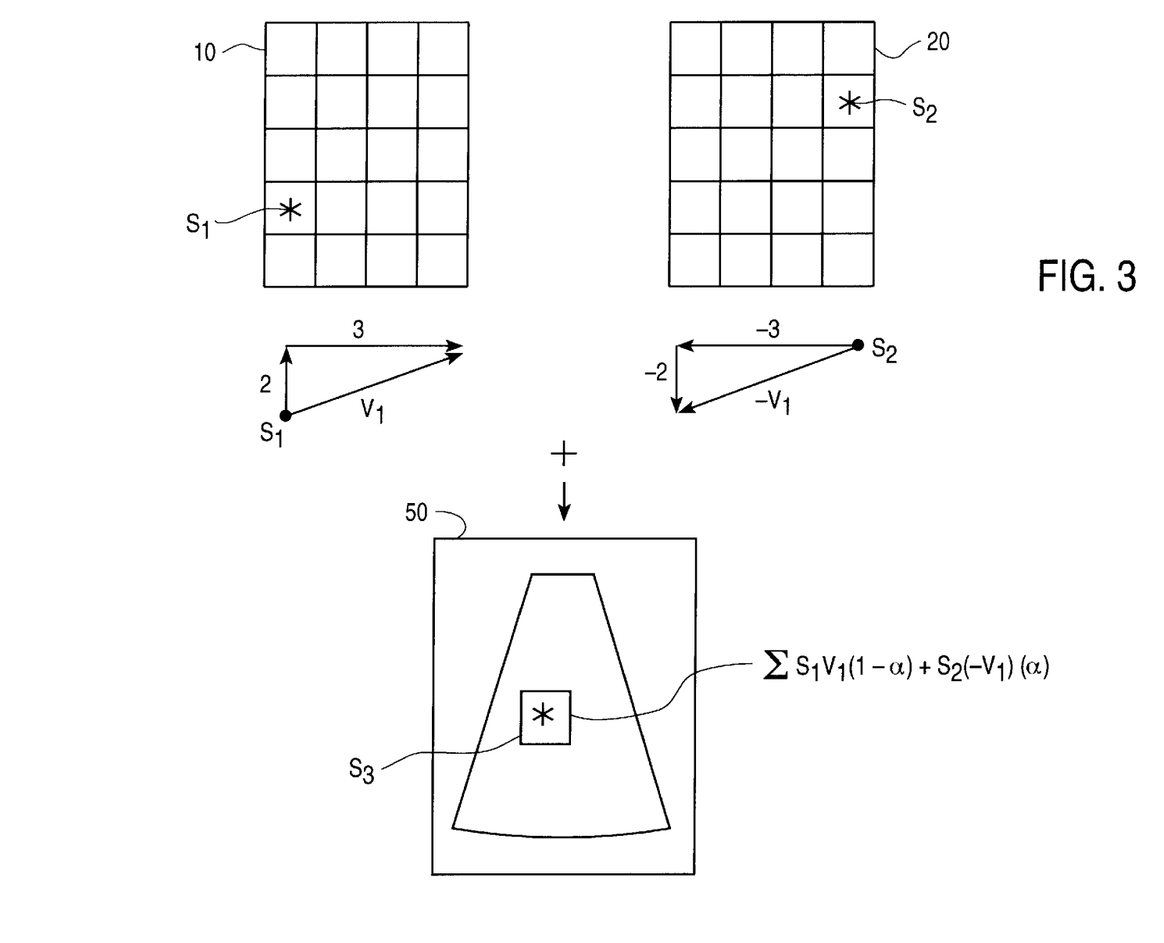
FIGS. 3 and 4 illustrate a method of computing a movement vector and using the movement vector to produce an interpolated ultrasound image according to the present invention.
Figure 4:
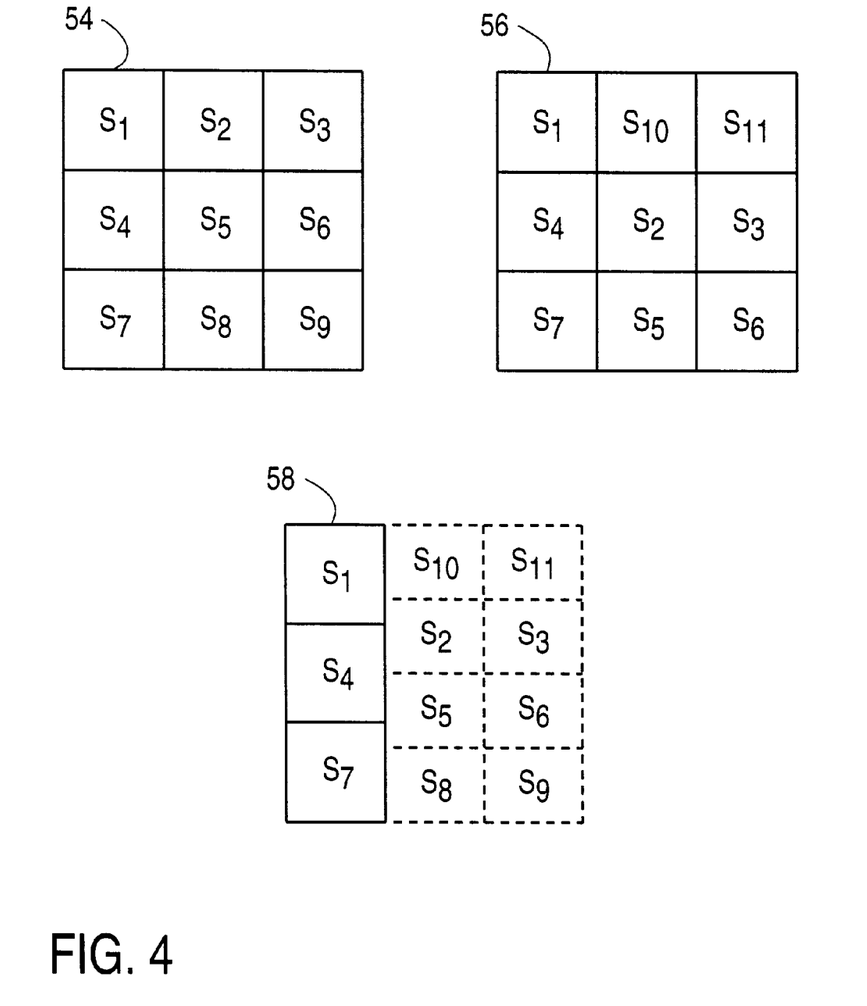

FIGS. 3 and 4 illustrate how the present invention creates interpolated images that simulate the movement of objects between the images. Again, an initial ultrasound image 10 is created and stored in memory followed by a subsequent ultrasound image 20. Each of the images 10 and 20 are then divided into a plurality of segments. A search is then conducted for each segment to determine how an object of interest in a particular segment has moved from one image to the next. For example, an object of interest in a segment $S_1$ is found to have moved from a lower left hand corner of the image to a segment $S_2$ in an upper right hand corner of the image. The search is preferably carried out using a Sum-Absolute-Difference (SAD) technique hereby the absolute difference of the corresponding pixels in two segments are determined and summed. The segment having the smallest sum is determined to be the corresponding segment in the subsequent image.

Once the location of the corresponding segment is known, a movement vector is calculated that describes the movement of the object of interest from one segment to another. For example, the object of interest in the segment $S_1$ moves up two segments and to the right three segments. Therefore, a movement vector $\vec{V}_1$ is calculated as (2, 3) for this segment. The movement of the object of interest from segment $S_2$ to the segment $S_1$ is simply the inverse of the vector $\vec{V}_1$. Therefore, for segment $S_2$, a movement vector $-\vec{V}_1$ is calculated having values (−2, −3).

An interpolated image 50 is created using data from both of the actual images 10 and 20. For example, the intensity of the individual pixels in a segment $S_3$ of the interpolated image 50 are determined by combining the intensity of the pixels in each of the corresponding segments according to the equation $$\Sigma S_1 \vec{V}_1 (1-\alpha) + S_2(-\vec{V}_1)(\alpha) \tag{1}$$

where $S_1$ and $S_2$ represent the intensity values of the pixels in the segments $S_1$ and $S_2$, $\vec{V}_1$ and $-\vec{V}_1$ are the movement vectors that define the position of the segment being constructed and a proportional to the time at which the interpolated image is to be displayed between the actual images. For example, $\alpha$ equals 0.5 for an interpolated image to be displayed midway between actual images.

FIG. 4 shows in detail how movement vectors are calculated for segments of sequential ultrasound images. A pair of sequential ultrasound images 54, 56 are divided into a plurality of segments labeled $S_1$–$S_9$ that are enlarged for purposes of illustration. In the second image 56, the objects of interest in the segments $S_1$, $S_4$ and $S_7$ have not changed position, such as might occur when imaging tissue or an artery wall. In contrast, the objects of interest in the segments $S_2$, $S_3$, $S_5$ and $S_6$ have moved. In addition, new pixel data contained in segments $S_{10}$ and $S_{11}$ have entered the subsequent ultrasound image 56.

Because the objects of interest contained in segments $S_2$, $S_3$, $S_5$ and $S_6$ have moved, movement vectors for these segments are determined. One or more interpolated images 58 are created wherein objects of interest located in the segments for which movement vectors have been calculated are shown at a position that is dependent upon the time at which the interpolated image is to be shown relative to the time between the actual ultrasound images i.e., somewhere along the movement vectors.

Information contained in segments that are leaving the image, such as in segments $S_8$ and $S_9$ is simply shifted to accommodate those segments for which movement vectors are calculated. Those segments having new pixel data, such as in segments $S_{10}$ and $S_{11}$ are preferably not shown until all the data for that segment can be shown in the image. This can be accomplished by drawing a border or mask around the edge of the interpolated images. Preferably, the border is equal in size to the segments used to divide the image.

Figure 5:
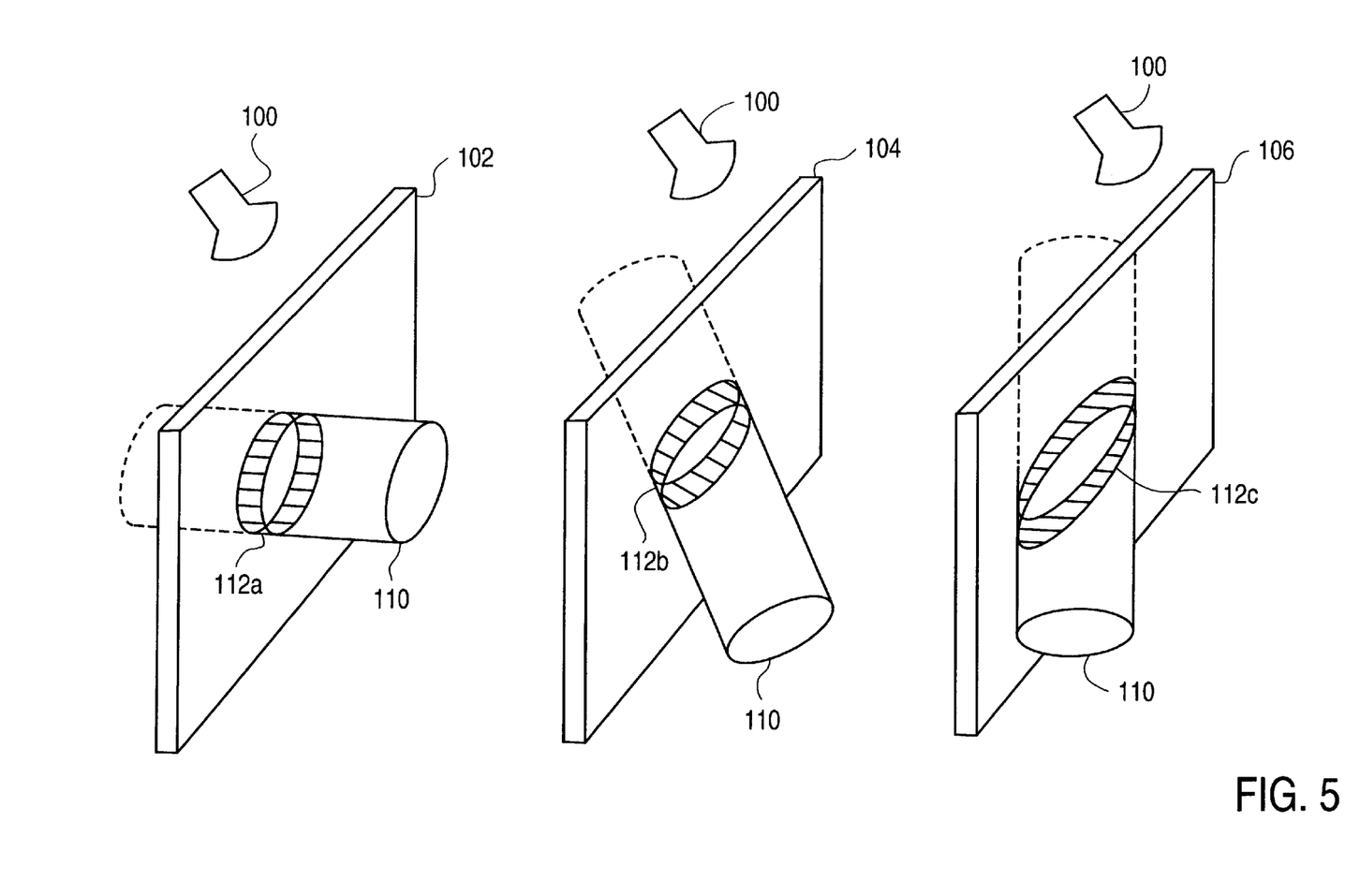
FIG. 5 illustrates how movement of an object affects three-dimensional ultrasound imaging.

In addition to creating interpolated images, the present invention is also useful in correcting for movement of an object of interest or a transducer movement when creating three-dimensional ultrasound images. FIG. 5 illustrates a conventional way in which three-dimensional ultrasound images are obtained. A transducer 100 receives ultrasonic data in an image plane of a patient's body. The transducer is moved and the data for a new image plane is collected. The echo data from each of the image planes are combined in order to produce a three-dimensional representation of an object of interest.

Many times during the examination of a patient, the object of interest will move relative to the image plane in which the ultrasound echo signals are collected. For example, an object of interest 110 creates a number of echo data points 112*a* within an image plane 102. When the transducer is moved to collect data in an image plane 104, the object of interest has moved and creates a set of echo data 112b in the image plane 104 that differs from the previous image plane 102. If the object of interest moves still further relative to an adjacent image plane 106, a set of echo data 112c is created that is further misaligned.

In order to produce an accurate three-dimensional model of an object of interest, it is necessary to compensate for the misalignment of echo data that occurs due to movement of the object of interest relative to the image plane of echo signals received by the ultrasonic transducer. To accomplish this, the present invention stores pixel data for sequential ultrasound images obtained from adjacent image planes 102, 104, 106 and determines the movement of an object of interest with respect to these adjacent images. The movement of an object of interest is determined using the SAD method described above. For each group of pixels or segment in an image that is determined to have moved between successive images, a movement vector is calculated and the segment of pixels is moved to compensate for the movement. This can be seen in FIG. 6, whereby the set of echo data 112b is compensated for the movement of the object of interest between the image plane 102 and the image plane 104. Similarly, the echo data 112c is compensated for the movement of the object of interest that occurs between the image planes 104 and 106.

Figure 6:
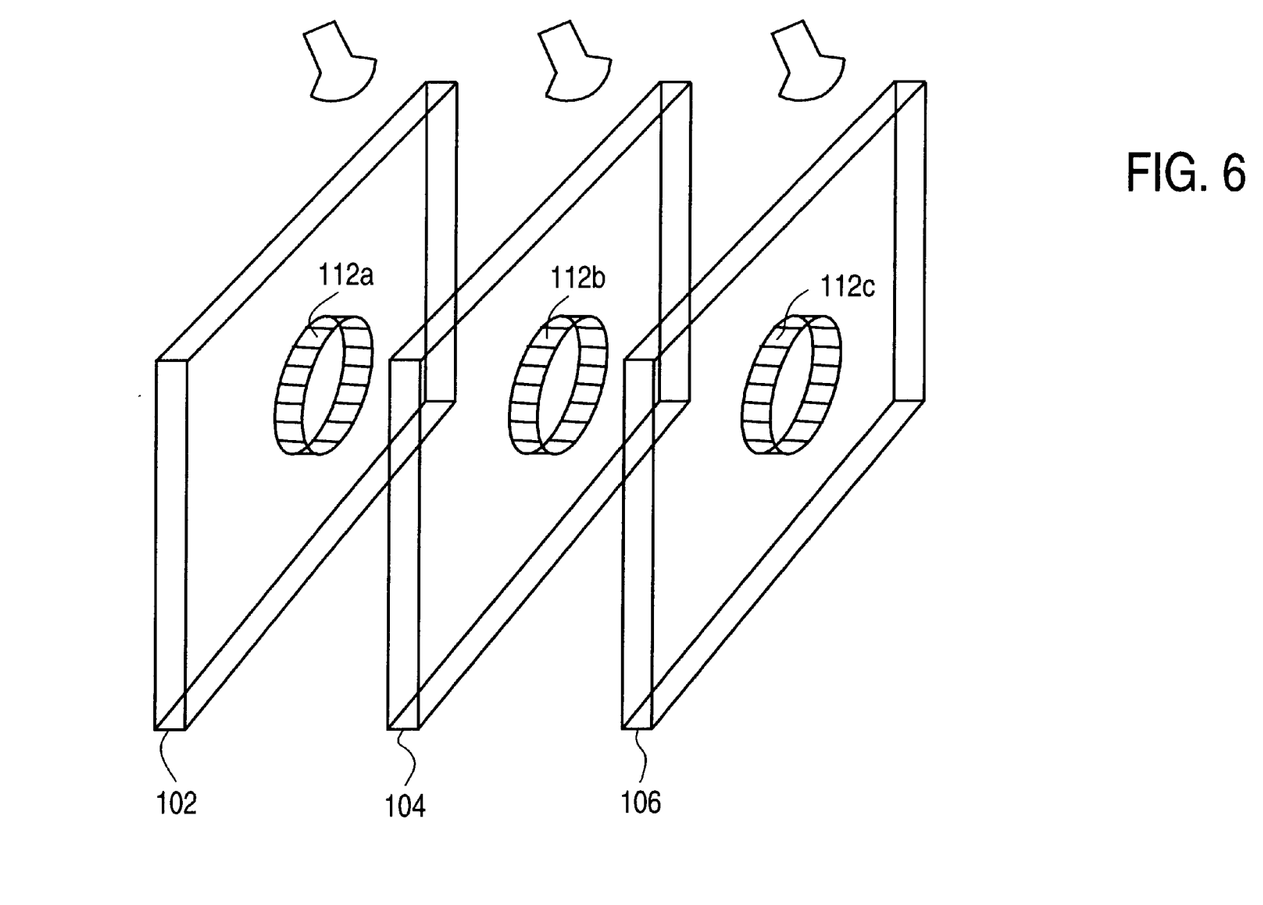
FIG. 6 illustrates how sequential ultrasound images can be compensated for movement of an object to produce a three-dimensional ultrasound image according to the present invention.

Once the echo data has been compensated for the movement between image planes, the elevational movement of the transducer used to create the subsequent images can be estimated and compensated sequential images can then be combined and analyzed using ray tracing or other rendering techniques in order to produce a three-dimensional representation of the object of interest. Therefore, a more accurate three-dimensional images of objects of interest can be obtained. Techniques for estimating transducer movement and producing three-dimensional ultrasound images are described in U.S. Pat. No. 5,655,535.

Figure 7:
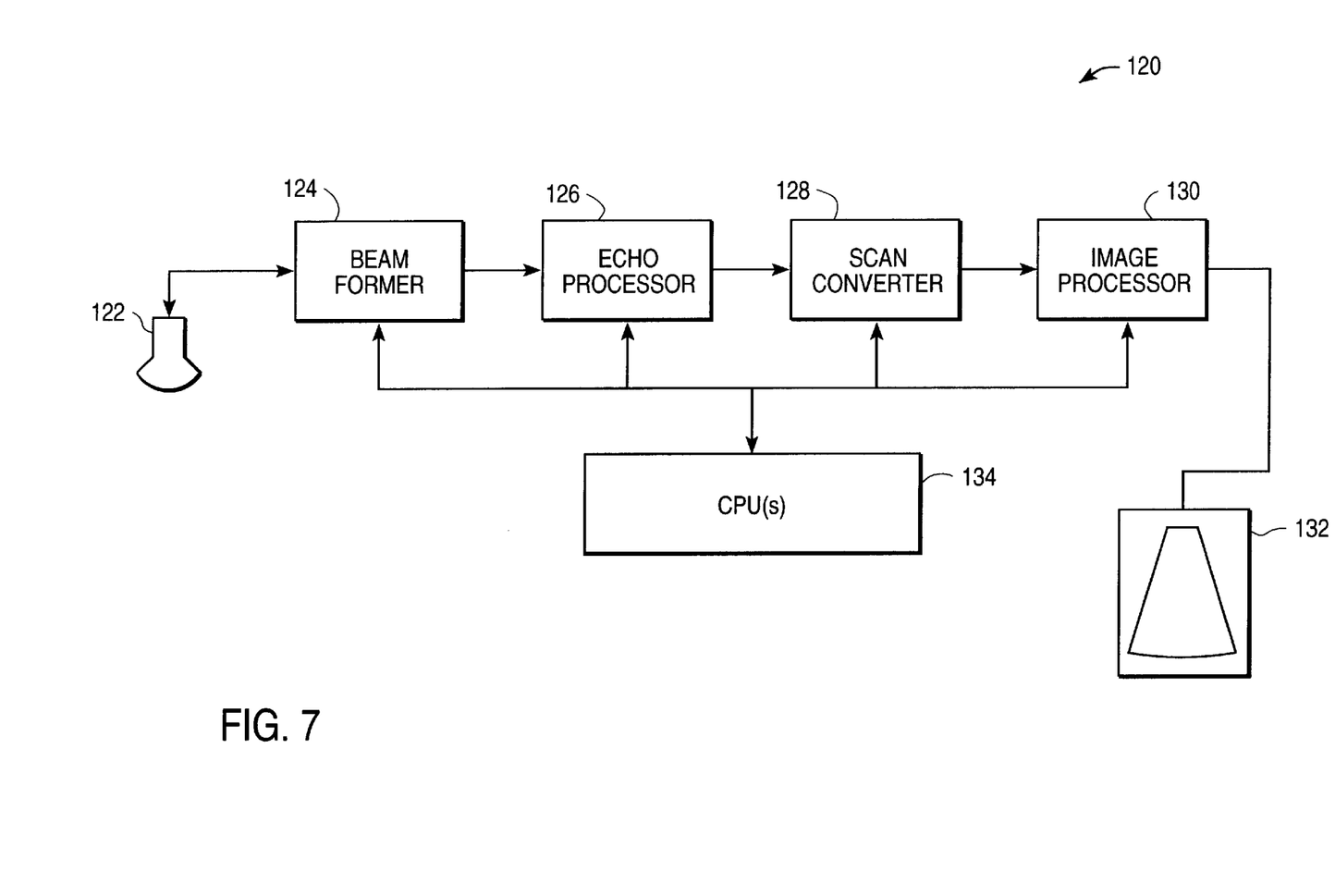
FIG. 7 is a block diagram of an ultrasound system that produces images according to the present invention.

FIG. 7 is a block diagram of an ultrasound system that produces interpolated images and/or compensates for the movement of an object of interest and transducer according to the present invention. An ultrasonic transducer 122 comprises an array of piezoelectric crystals that deliver ultrasonic energy into a patient and receive ultrasonic echoes from the patient. Electrical signals representative of the echoes produced by the transducer 122 are delivered to a beam former 124 where they are selectively combined to produce an indication of the echo intensity along a particular direction or beam in the patient. The data produced by the beam former 124 is fed to an echo processor 126 that calculates an echo intensity at each position along a beam and may calculate a Doppler shift of the echoes received along a particular beam. Data from the echo processor 126 is fed to a scan converter 128 that converts the data into a form that can be readily displayed on a video monitor.

The data produced by the scan converter is stored in an image processor 130 where an additional processing, such as adding color, may be performed prior to displaying the images on a video monitor 132. Controlling the operation of the above-referenced parts are one or more central processing units 134. The central processing units 134 also receive commands from a user through a variety of controls (not shown) that allow the user to adjust the operation of the ultrasound machine.

In the present invention, the compensation for movement of an object of interest is performed in the image processor 130 after the data has been processed by the scan converter 128. However, it will be appreciated that this compensation could be performed in the echo processor 126 or by the central processing units 134.

Figure 8:
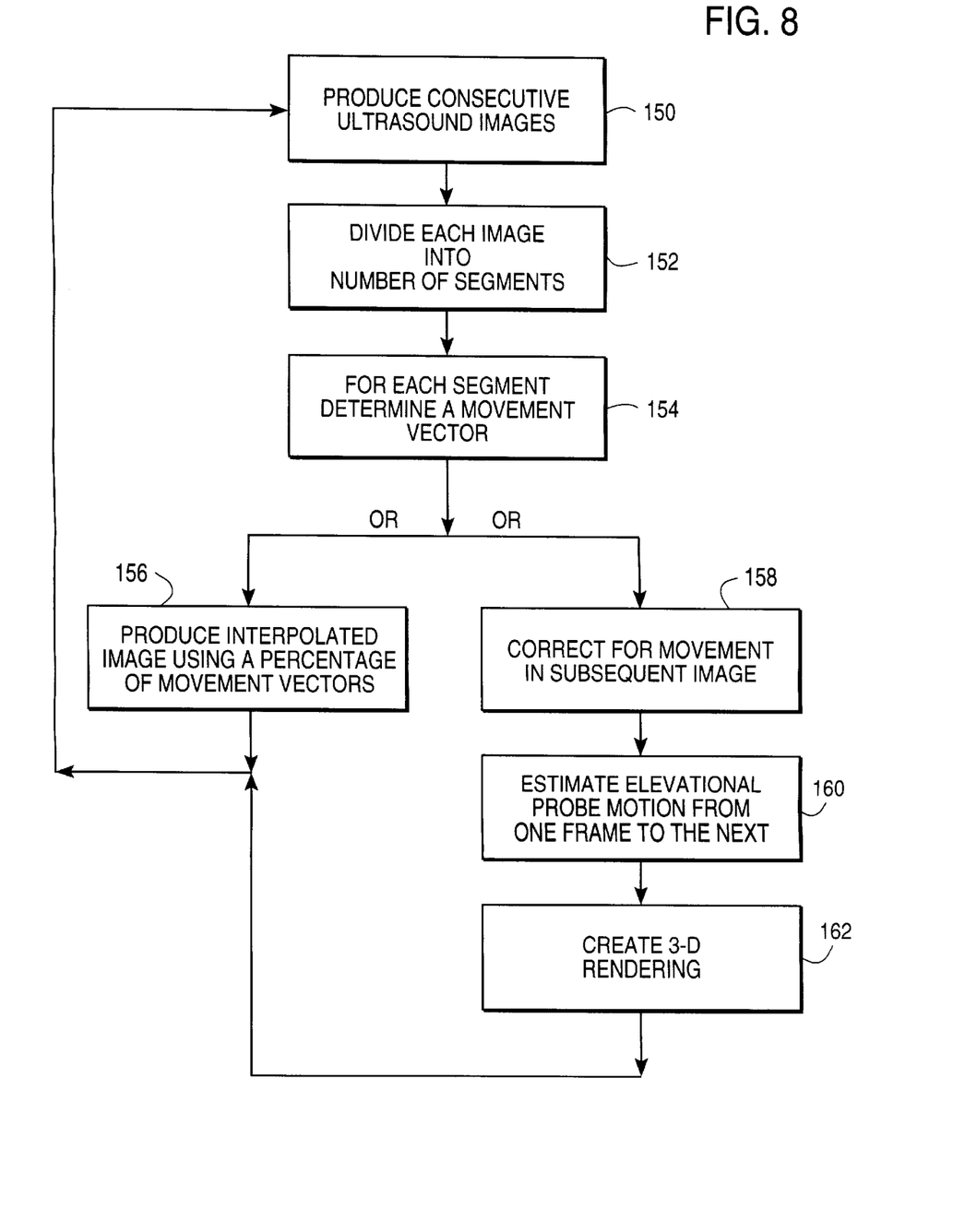
FIG. 8 is a flow chart of the steps performed by the present invention to produce interpolated images that show movement of an object or produce a three-dimensional image that is compensated for movement of an object.

FIG. 8 is a flow chart showing the overall operation of the ultrasound system according to the present invention. Beginning with a step 150, the ultrasound system produces at least two consecutive ultrasound images and stores these images within an image memory. At a step 152, each image is divided into a number of segments, and at a step 154, a search is performed to determine a movement vector for the objects of interest that have changed position between the consecutive ultrasound images.

If the ultrasound machine is operating in a two-dimensional mode, processing proceeds to a step 156, wherein one or more interpolated ultrasound images are produced using data from the stored ultrasound images and a percentage of the movement vectors calculated.

If the ultrasound system is operating in a three-dimensional mode, processing proceeds to a step 158, wherein the movement vectors are calculated in order to compensate the images for movement of the object of interest. At a step 160, the motion of the probe is estimated from the motion corrected images. At a step 162, the motion corrected images are then analyzed to produce a three-dimensional image of the patient. In each mode, processing then returns to a step 150 and continues as indicated above.

The embodiments of the invention in which an exclusive property or privilege is claimed are defined as follows:

1. A method of producing one or more interpolated ultrasound images, comprising:

creating at least two sequential ultrasound images;

determining the movement of one or more objects of interest from a position within a first image of the sequential ultrasound images to a position within a second image of the sequential ultrasound images;

calculating a movement vector that defines the movement of each of the objects of interest; and creating the one or more interpolated images by combining data from the first and second sequential image and scaling the data by a percentage of the movement vectors.

2. The method of claim 1, wherein the one or more movement vectors are determined by:

dividing the first and second ultrasound image into a number of sections and determining for each section in the first image a closest corresponding section in the second image; and calculating a relative position between the corresponding sections in the first and second image.

3. The method of claim 1, further comprising inhibiting a display of new data in the interpolated ultrasound images.

4. The method of claim 3, wherein the display of new data is inhibited by producing a border around the interpolated image, the border having a width that is at least equal to the width of sections into which the first and second ultrasound images are divided.

5. An ultrasound system comprising:

an ultrasound probe that directs ultrasound energy into a patient and receives ultrasound echoes from the patient;

a beamformer that receives the ultrasound echoes from the ultrasound probe and produces ultrasound echo data;

a scan converter that receives the ultrasound echo data and produces ultrasound image data; and an image processor that receives the ultrasound image data and stores a pair of sequential ultrasound images and produces one or more interpolated images, wherein the interpolated images are produced by:

dividing the sequential ultrasound images into a plurality of sections;

for each section determining a corresponding section in another of the pair of ultrasound images;

defining one or more movement vectors that describe the relative position of corresponding sections in each of the pair of ultrasound images; and combining data from each of the pair of ultrasound images using the one or more movement vectors.

6. A method of producing three dimensional ultrasound images, comprising:

generating two or more ultrasound images that are obtained in different image planes;

storing the ultrasound images in a memory;

analyzing the ultrasound images to determine how one or more objects of interest move from one image to another;

compensating the images for the movement of one or more objects of interest; and combining the compensated images to produce a three dimensional ultrasound image.

7. The method of claim 6, wherein the step of analyzing the ultrasound images comprises:

dividing the ultrasound images into a plurality of sections;

locating corresponding sections in each of the ultrasound images; and determining a relative position of the corresponding sections in the ultrasound images.

8. The method of claim 7, wherein the relative position of the corresponding sections in the ultrasound images is defined by a movement vector and wherein the images are compensated by adjusting the position of a section within the image in accordance with a movement vector defined for the section.

* * * * *